April 7, 1964 W. J. BROWN 3,128,422
CONTROL CIRCUIT FOR UNIDIRECTIONAL CURRENT CONDUCTING DEVICES
Filed April 18, 1960 5 Sheets-Sheet 1
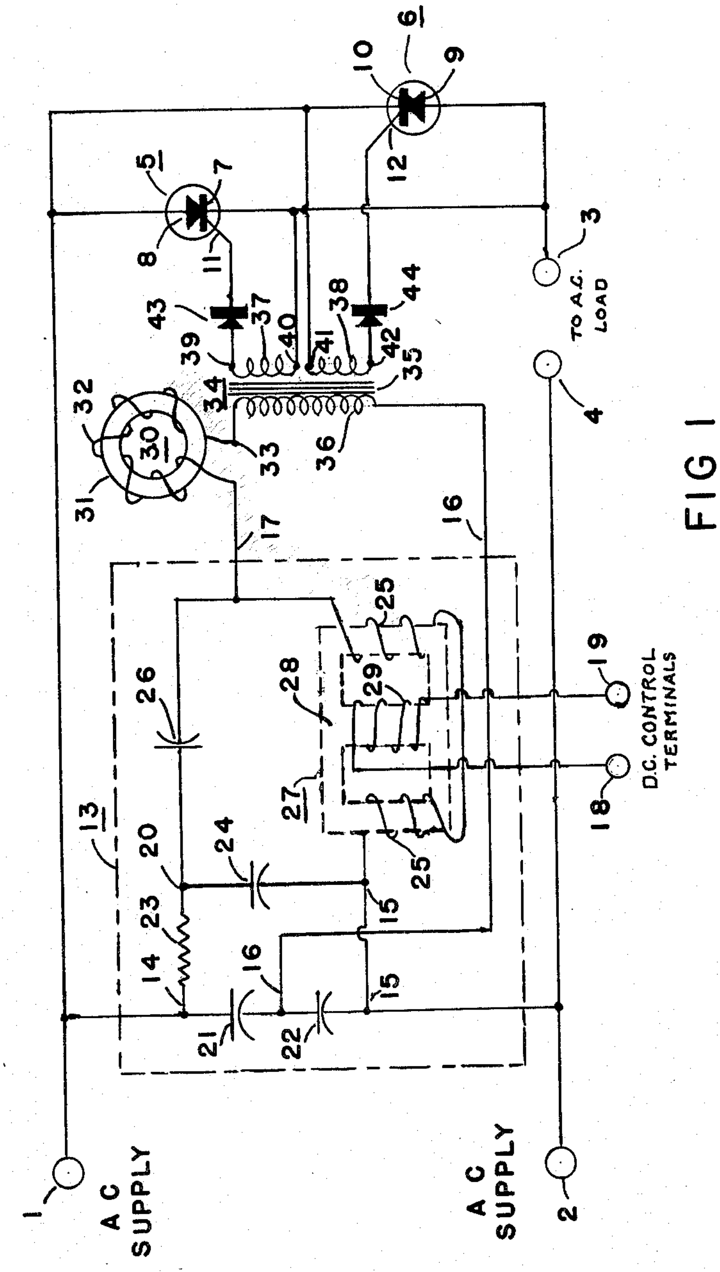
FIG I
INVENTOR.
WALTER J. BROWN
BY Walter J. Brown April 7, 1964 W. J. BROWN 3,128,422

CONTROL CIRCUIT FOR UNIDIRECTIONAL CURRENT CONDUCTING DEVICES

Filed April 18, 1960 5 Sheets-Sheet 2

INVENTOR.
WALTER J. BROWN
BY Walter J. Brown

CONTROL CIRCUIT FOR UNIDIRECTIONAL CURRENT CONDUCTING DEVICES

Filed April 18, 1960 5 Sheets-Sheet 3

INVENTOR.
WALTER J. BROWN
BY Walter J Brown

INVENTOR.
WALTER J. BROWN
BY Walter J Brown

INVENTOR.
WALTER J. BROWN
BY Walter J. Brown 3,128,422

CONTROL CIRCUIT FOR UNIDIRECTIONAL CURRENT CONDUCTING DEVICES

Walter J. Brown, Stamford, Conn., assignor to Sprague Electric Company, North Adams, Mass., a corporation of Massachusetts Filed Apr. 18, 1960, Ser. No. 23,004
Claims priority, application Great Britain Apr. 21, 1959
17 Claims. (Cl. 321—45)

This invention relates to electrical control systems of the kind in which an electrical load is supplied from an alternating current source through a converter which may comprise, for instance, one or more unidirectional conducting devices such as controlled rectifiers, each provided with a gate or control electrode for "firing" or initiating current conduction through the rectifier by the application of pulses of voltage or current to said gate or control electrode, and in which the power supplied to the load is controlled by varying the timing of such pulses in relation to the timing or phase angle of the voltage from said alternating current source.

The invention is particularly useful in conjunction with solid state controlled rectifiers such as those known as silicon controlled rectifiers, PNPN transistors, PNPN switches, trinistors, or solid state thyratrons. Such controlled rectifiers are characterized by having an anode, a cathode and a gate or other control electrode which exhibits a low and usually variable input resistance in the range of 10 to 100 ohms; furthermore, the gate current and voltage required to fire the rectifier may vary widely from one rectifier to another, and also may vary widely with temperature.

Furthermore, such solid state controlled rectifiers, while requiring substantial instantaneous gate power to fire them, are also severely limited as to the average power and as to the peak voltage which can be applied to the gate without breaking it down. In a typical commercial solid state controlled rectifier, for instance, an instantaneous gate power of 3.5 volts, 120 milliamperes, or 420 milliwatts is required to fire the rectifier at a temperature of −65° C., but the average gate power must never exceed 500 milliwatts; also, the peak voltage applied to the gate must never exceed 10 volts positive or 5 volts negative under any conditions.

In order to vary the output of such a controlled rectifier from zero to maximum, it is necessary to vary the phase angle of the firing pulse over a range of 180 degrees in relation to the alternating voltage applied to its anode, and during such variation the gate voltage and power must be maintained within limits such as those above specified, under all reasonable conditions of low, normal or high applied alternating voltage.

It is an object of this invention to produce a spike-shaped pulse useful for initiating conduction in controlled semi-conductor devices whereby this pulse is characterized by a substantially constant peak power which is maintained substantially constant at all phase angles and which is sufficient to fire the rectifier even with low alternating input voltage.

Another object of this invention is the provision of a spike-shaped pulse signal whose average power is very much lower than the peak power so that even under conditions of unusually high line voltage the limiting average-gate power is never exceeded.

It is a further object of the invention to provide a "failsafe" firing device, in which in the event of loss of its controlling signal, the timing or phase angle of the firing pulse is retarded so that the pulse commences only after completion of the positive half cycle of anode voltage on the controlled rectifier.

While the invention is specifically described with reference to the firing of solid state controlled rectifiers, it is not limited thereto, and may be used for the firing of gas or vapor-filled thyratron tubes, or of grid-controlled mercury pool rectifiers, or of ignitrons, or indeed for any other purpose which requires the generation of pulses having an adjustable phase relationship with an alternating current input signal.

In the improved control system according to one feature of the invention, the firing of a controlled rectifier is initiated and adjusted by pulses obtained from the output of a peaking network which is supplied from a resonant phase-shifting network comprising mutually variable inductive and capacitive elements and other elements supplied from an alternating current source, which elements are so connected as to produce an alternating output voltage, the phase angle of which can be varied by more than 180 degrees while its amplitude remains substantially constant; preferably the pulses applied to each controlled rectifier are themselves rectified so as to be substantially unidirectional.

Frequently, a converter of the kind described includes at least two controlled rectifiers which may be connected for instance in a full wave rectifying circuit, supplying a direct current load, or which may alternatively be connected in inverse parallel, so as to supply alternate half waves of current to an alternating current load, and for reasons of economy it is desirable to initiate and adjust the firing of both controlled rectifiers from a single control system, including a single phase-shifting network and a single peaking network. In attempting to control two solid state controlled rectifiers from such a single control system, I have found that the relative firing angles of the two controlled rectifiers may depart considerably from the ideal condition in which the two firing angles should be exactly 180 degrees apart in order to develop equal outputs from the two controlled rectifiers, and I have concluded that this is due to the fact that the currents flowing into each of the two rectifier gates may differ to a considerable extent, thus drawing a resultant asymmetrical current from the peaking and phase-shifting networks and producing asymmetric saturation of the magnetic cores of such networks during alternate half cycles.

According to another feature of the invention, the currents flowing to the gates or control electrodes of the controlled rectifiers are blocked or isolated from the phase-shifting and peaking networks by means of a transformer or a blocking capacitor or both.

A further limitation in existing solid state controlled rectifiers is that they have a relatively small overload capacity and that such overload capacity is of very short duration. Accordingly, it is desirable that, in case of overload, the rectifier anode current should be suppressed in the shortest possible time. This is particularly necessary in the case of self-regulating feedback circuits in which an output voltage to a load is automatically maintained by balancing the load voltage or a voltage dependent upon the load voltage, in a feedback circuit, against a reference voltage, through a sensitive control device, so connected as to increase the converter output upon a decrease in the load voltage. Such a system tends to maintain constant load voltage, regardless of the converter output current and in the case of a short-circuit or heavy overload, the current will automatically increase to the extent that it may destroy the controlled rectifiers.

In accordance with another feature, the improved control system according to the invention is so arranged in a feedback circuit that the firing pulses are spike-shaped and are of such short duration that, in the event of excessive overload, the phase angle of such pulses is so far advanced that each pulse has substantially terminated before the initiation of positive anode voltage, so that the anode current is extinguished.

Alternatively, in other applications, it may be desirable to provide continuity of operation by ensuring that the anode current is not extinguished when the phase angle of the firing pulse is advanced by somewhat more than 180 degrees so that it occurs before the initiation of positive anode voltage.

According to an alternative feature of the invention, the output impedance of the phase-shifting network is made sufficiently high to deliver a plurality of short pulses to the gate of the controlled rectifier during each appropriate half cycle, so that if the first pulse should occur before the initiation of positive anode voltage, the rectifier will nevertheless be fired by a subsequent pulse.

FIGURE 1 is a circuit diagram of one form of my invention.

FIGURES 2(A), 2(B) and 2(C) show the vector relationships between certain alternating voltages with reference to FIGURE 1, under conditions of no output, partial output and full output respectively.

FIGURES 3(A), 3(B) and 3(C) show the voltage-time relationships between certain alternating voltages with reference to FIGURE 1, under conditions of no output, partial output and full output, respectively.

FIGURES 4(A), 4(B) and 4(C) show the waveforms of certain voltages in the arrangement of FIGURE 1, under one set of impedance matching conditions.

FIGURES 5(A), 5(B) and 5(C) show the waveforms of certain voltages in the arrangement of FIGURE 1, under another set of impedance matching conditions.

FIGURES 6(A), 6(B) and 6(C) show the waveforms of certain voltages in the arrangement of FIGURE 1, under a further set of impedance-matching conditions.

Figures 2A, 3A:
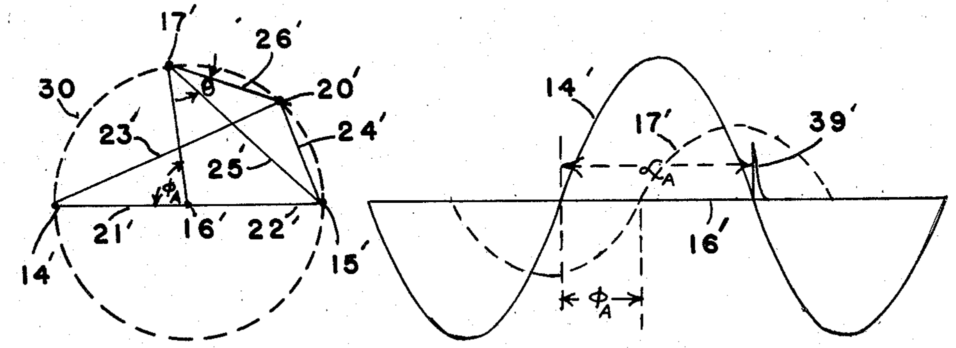

FIGURE 1 shows an electrical power regulating system having input terminals 1 and 2 for connection to an alternating current source, and load terminals 3 and 4 for connection to a alternating current load. The power supplied to the load is regulated by means of the two controlled rectifiers 5 and 6 which are connected in series with the load with opposite polarity so that rectifier 5 will supply positive half waves to terminal 3, and rectifier 6 will supply negative half waves to terminal 3; for this purpose the cathode 7 of rectifier 5 is connected to terminal 3 and its anode 8 is connected to termnal 1; the anode 9 of rectifier 6 is connected to terminal 3 and its cathode 10 is connected to terminal 1.

Each ot the rectifiers 5 and 6 is provided with a control electrode or gate, 11 and 12 respectively. Each rectifier is of the type which requires the application of a positive pulse of current or voltage to its control electrode or gate in order to initiate conduction from anode to cathode, after which conduction continues until the anode voltage becomes negative with respect to the cathode. The rectifiers 5 and 6 are preferably of the type known as silicon controlled rectifiers, trinistors, or PNPN transistors, or solid-state thyratrons, having gates 11 and 12 for initiating conduction.

My invention relates principally to the means for producing and varying the required pulses of voltage and current at the gates or control electrodes 11 and 12. In order to regulate the rectifier current from zero to maximum, it is necessary to vary the phase angle or timing of the pulses over a range of 180 degrees in relation to the anode voltage, as will be described with reference to FIGURE 3. Furthermore, it is necessary to provide a pulse having a predetermined minimum peak amplitude of voltage and current in order to ensure firing, or initiation of conduction, of the rectifiers. Also, with certain types of rectifiers, such as the silicon controlled rectifier, it is essential to limit the maximum peak voltage and current amplitudes and the duration of the pulses in order to prevent damage to the rectifier. Accordingly, it is desirable to produce a short spike shaped pulse of short duration, which remains reasonably constant in amplitude, while its phase angle is variable over 180 degrees in relation to the anode voltage. Furthermore, it is desirable that the phase angle of the pulse should vary in a substantially linear relationship with a controlling voltage applied to the phase-shifting device. Finally, it is desirable that when the controlling voltage is removed, the phase angle of the pulse is so far retarded that it commences only after the positive half cycle of rectifier anode voltage is completed, so that the anode cannot deliver an output current and the system is "failsafe." All these objectives are achieved with my phase-shifting and pulse forming system which will now be described with reference to FIGURES 1, 2 and 3.

FIGURE 1 shows the components and their interconnecting conductors identified by their numerals.

FIGURE 2 shows the vector relationship of the voltages between the conductors and across the components, identified by the same prime numerals.

FIGURE 3 shows the voltage-time relationship between certain conductors, identified by the same prime numerals.

Figures 2B, 3B:
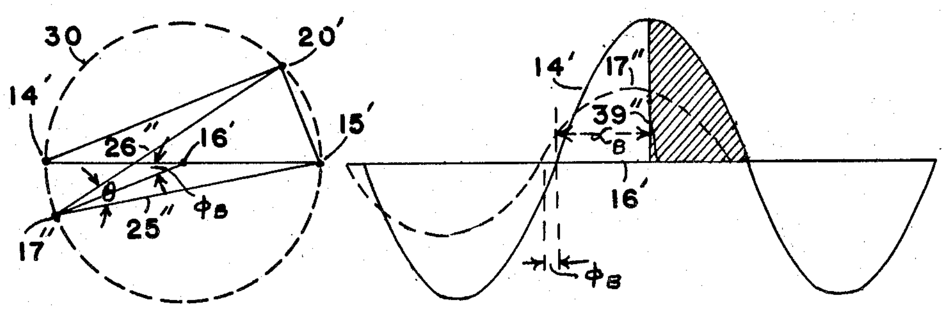

FIGURES 2(A) and 3(A) relate to the zero load or what may be termed "failsafe" condition of rectifiers 5 and 6; FIGURES 2(B) and 3(B) relate to the half load and FIGURES 2(C) and 3(C) to the full load conditions.

In FIGURE 1, the components which are enclosed within the chain-dotted line 13 are connected so as to form a phase-shifting network which has input conductors 14, 15 connected to the alternating current supply terminals 1 and 2. It also has alternating current output conductors 16, 17 and direct current control terminals 18 and 19. The phase-shifting network is so connected as to develop at its output terminals 16 and 17 an alternating voltage, 16'—17' as shown in FIGURES 2 and 3, the phase angle of which can be varied over 180 degrees in relation to the alternating supply voltage, while its amplitude remains reasonably constant, when the direct current voltage applied to its control terminals 18 and 19 is varied over a predetermined range.

In FIGURE 1, capacitors 21, 22 are connected in series between the input conductors 14 and 15, with the output conductor 16 connected therebetween; this provides a voltage dividing means which establishes the potential 16' of the output conductor at an intermediate point on the input voltage vector 14', 15' of FIGURE 2. Resistor 23 and capacitor 24 are also connected in series between the input conductors 14 and 15, with a point 20 connected therebetween; the voltages across resistor 23 and capacitor 24 are shown in FIGURE 2 by the right angled triangle 14'–20'–15'. A resonant circuit comprising inductive elements 25 and capacitor 26 is connected across capacitor 24, and the output conductor 17 is connected to the common point between 25 and 26; the voltages across inductive elements 25 and capacitor 26 are shown in FIGURE 2 by the triangle 15'–17'–20' having an acute angle $\theta$ which is equal to the loss angle of the inductive elements 25.

The inductive elements 25 comprise the serially connected alternating current windings of a saturable reactor 27 having a saturable magnetic core 28 with three legs; the alternating current windings 25 are located on the outer legs and serially connected, and a direct current control winding 29 is located on the center leg.

When no current is flowing through the direct current control winding 29, the inductance of coils 25 is at its maximum value, and its voltage vector 25' is long in comparison with the vector 26′ of the voltage across capacitance 26, as shown in FIGURE 2(A). When direct current is applied to the control winding 29, the core 28 is partially saturated, thus reducing the inductance of the coils 25 and reducing the length of vector 25′ in relation to the length of vector 26′; if the loss angle $\theta$ of the inductive element 25 remains constant, the reduction in length of vector 25′ will cause the point 17′ to move around the arc 30 of a circle to a new location 17″ on FIGURE 2(B) and, with further reduction in length, to a location 17‴ on FIGURE 2(C). By suitable choice of the relation between resistance 23, capacitance 24 and the loss angle $\theta$, the arcuate locus 30 of point 17′ may be arranged to pass through or approximately through the point 14′ of FIGURE 2. An output voltage is taken between conductors 16 and 17 of the phase-shifting network 13, and it will be seen from FIGURES 2(A), 2(B) and 2(C) that as the direct current in the control winding 29 is increased, the phase angle of this voltage is varied over 180 degrees, from 16′—17′, through 16′—17″, to 16′—17‴, while its amplitude remains substantially constant.

Figures 2C, 3C:
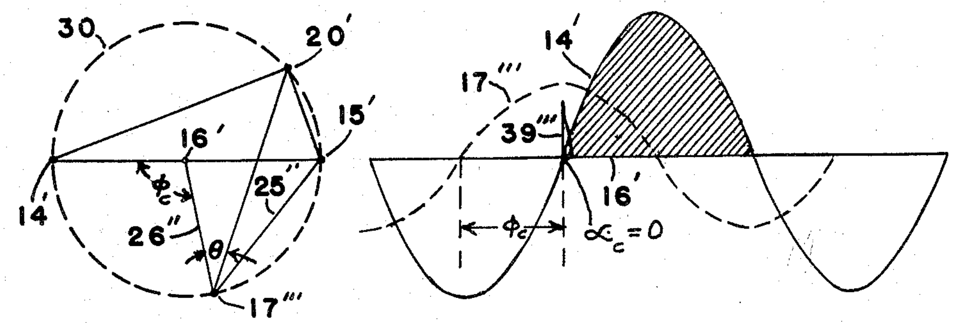

FIGURES 3(A), 3(B) and 3(C) show the voltage-time relationships of the input and output voltages of the phase-shifting network 13 under the three conditions which are shown vectorially in FIGURES 2(A), 2(B) and 2(C). The solid lines 14′ show the sinusoidal voltage existing at the input conductor 14 in relation to the intermediate conductor 16, which voltage is in phase with the supply voltage from terminal 2 to terminal 1. The dotted lines 17′, 17″ and 17‴ in FIGURES 3(A), 3(B) and 3(C) show the output voltage from conductor 16 to conductor 17 for the three conditions of FIGURES 2(A), 2(B) and 2(C). It will be seen that the phase angle of the output voltage 16′—17′ in relation to the input voltage 16′—14′ is progressively advanced as the control current increases. With zero control current this phase angle $\phi_A$ is lagging by almost 90 degrees as shown in FIGURES 2(A) and 3(A); with a moderate control current, the phase angle $\phi_B$ is leading by a small amount, as shown in FIGURES2 (B) and 3(B); with a higher control current the phase angle $\phi_C$ is leading by slightly more than 90 degrees as shown in FIGURES 2(C) and 3(C).

The output voltage vectors 16′—17′, 16″—17″ and 16‴—17‴ of FIGURE 2 and the sinusoidal output waveforms shown by the dotted lines 17′, 17″ and 17‴ in FIGURE 3 represent the output voltages which would prevail between conducors 16 and 17 if there were no load connected across these conductors, and it should be noted that the amplitude of this output voltage remains substantially constant; in my complete system the output waveforms 17′, 17″ and 17‴ of FIGURE 3 are considerably modified by the load connected across conductors 16 and 17 as will later be described.

Referring again to FIGURE 1, an inductor 30 has a toroidal core 31 of magnetic material having a substantially rectangular hysteresis loop with abrupt saturating properties, such as the alloys known by the trade names Deltamax or Orthonol, and this core carries a toroidal winding 32 which is connected between conductor 17 and point 33. A transformer 34 has a magnetic core 35, a primary winding 36 and secondary windings 37 and 38. The primary winding 36 is connected between point 33 and conductor 16, so that it is in series with the inductor winding 32 across the output conductors 16 and 17 of the phase shifting network 13.

The inductor 30 is so designed that when a sine wave voltage such as 17′ of FIGURE 3 is applied across its winding 32, a negligible magnetizing current flows through its winding until a voltage of sufficient magnitude has been applied for sufficient time to cause the flux density in its core 31 to reach a saturation level, at which point the magnetizing current sharply increases, thus creating an abrupt increase or pulse in the current which flows through the transformer primary winding 36. A low impedance path to such abrupt increase or pulse of current is provided through conductor 16, capacitors 22, 24 and 26, and conductor 17. This abrupt increase in the primary current of transformer 34 induces a steeply rising pulse of voltage into each of its secondary windings 37 and 38. The start 39 of secondary winding 37 is connected through diode 43 to the gate or electrode 11 of controlled rectifier 5, and the finish 40 of secondary winding 37 is connected to the cathode 7 of controlled rectifier 5. The start 41 of secondary winding 38 is connected to the cathode 10 of controlled rectifier 6, and the finish 42 of secondary winding 38 is connected through diode 44 to the gate or electrode 12 of controlled rectifier 6.

The transformer 34 is so polarized that when the inductor 30 saturates due to the application of positive voltage from terminal 17, a positive pulse is induced at the secondary terminal 39 and a negative pulse is induced at the secondary terminal 42. The diode 43 passes the positive pulse from terminal 39 on to the gate or electrode 11, thus firing, or initiating anode current conduction, of the controlled rectifier 5. The timing of these pulses is shown at 39′, 39″ and 39‴ in FIGURES 3(A), 3(B) and 3(C), and the corresponding periods of anode conduction are shown by the shaded areas in FIGURES 3(A), 3(B) and 3(C). It will be seen that the anode current may be continuously varied from zero to maximum by varying the phase angle of the pulse occurrence by 180 degrees in relation to that of the input voltage 15′ 14′. The negative pulse which is simultaneously developed at the transformer secondary terminal 42 is blocked by the diode 44 and does not appear at the gate 12 of the controlled rectifier 6. On the other hand, during the opposite half cycle, 180 degrees later than the above, the inductor 30 will be saturated due to the application of a negative voltage from terminal 17 of the phase-shifting network 13. This will induce a positive pulse at secondary terminal 42 which will be passed through diode 44 to gate 12 and which will fire the controlled rectifier 6 since its anode will also then be positive; a negative pulse will simultaneously be developed at secondary terminal 39 which will be blocked by diode 43 and will not be applied to gate 11 of controlled rectifier 5. In this way, the duration of anode current flow is simultaneously regulated in alternate and opposite half cycles by controlled rectifiers 5 and 6 resulting in regulation of the alternating current applied to the load terminals 3 and 4.

It will be seen from an examination of FIGURE 3(A) that the self-saturating inductor 30 provides a phase retarding means as well as a peaking means for the output signal 16′—17′ of the phase-shifting network. It retards the commencement of the firing pulse 39′ by approximately ninety degrees from the commencement of positive output signal 17′ and it also modifies said output signal so as to produce the spike shaped firing pulse 39′.

An important feature of the invention is that the configuration of the phase-shifting network 13 in FIGURE 1 is such that when the inductance of the windings 25 is at its maximum value, in the absence of a direct current control signal, the phase angle of the output between conductors 16 and 17 lags the phase angle of the input between terminals 15 and 14 by only ninety degrees approximately; this makes it possible to introduce the further lag of approximately ninety degrees in the inductor 30 which then produces the spike-shaped pulse 39′ of FIGURE 3(A) at approximately 180 degrees lagging the input voltage 15′—14′.

This desirable phase relationship is obtained by connecting the resonant circuit comprising inductive elements 25 and capacitive element 26 across a capacitive element 24 which is in series with a resistive element 23 across the alternating current input 14, 15, as will be seen from a study of FIGURE 2(A); the desired phase relationship results from the fact that the alternating voltage 20'—15' across capacitor 24 lags the alternating voltage 14'—20' across the resistor 23.

The transformer 34 is designed to have a turns ratio for suitable matching of the impedance between the gate or control electrodes 11 and 12 and the cathodes 7 and 10, to the output impedance of the phase-shifting network 13, across conductors 16 and 17. For example, when the rectifiers 5 and 6 are of the silicon controlled type, their gate-to-cathode impedances may each be between 10 ohms and 100 ohms but a relatively low voltage of the order of 3.5 volts is sufficient to fire the rectifiers and accordingly the transformer 34 is designed as a step-down transformer having few turns on its secondaries. In connection especially with silicon controlled rectifiers, I have found it is possible to produce several alternative pulse waveforms which are useful for alternative types of application, and FIGURES 4, 5 and 6 illustrate some of the alternative waveforms which I have obtained by different impedance matching of the transformer 34.

Figure 4A:
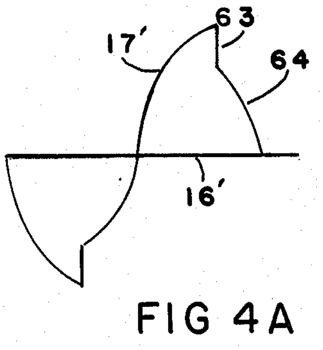
Figure 4B:
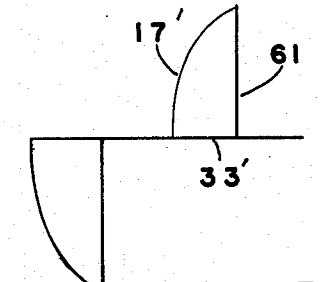
Figure 4C:
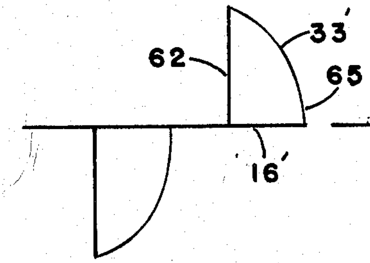

FIGURE 4(A) shows the output voltage 16'—17' of the phase-shifting network 13 under lightly loaded conditions when the primary impedance of transformer 34 is high in relation to the output impedance of the phase-shifting network 13. FIGURE 4(B) shows the voltage developed across the toroidal winding 32, between points 33 and 17, under the same conditions. FIGURE 4(C) shows the voltage developed across the transformer primary 36, between points 16 and 33 under the same conditions. When the toroidal inductor 30 saturates, it changes abruptly from a substantially non-conducting to a conducting condition and the voltage across it drops abruptly, as shown at 61 in FIGURE 4(B); this permits current to flow suddenly into the transformer primary 36 and suddenly develops a pulse of voltage across the primary as shown at 62 in FIGURE 4(C). The loading imposed by the transformer primary on the output 16—17 of the phase-shifting network 13 suddenly reduces its output voltage as shown at 63 in FIGURE 4(A), but sufficient output remains, as shown at 64, to sustain the transformer voltage pulse 33', as shown at 65 in FIGURE 4(C), and accordingly sustained pulses as FIGURE 4(C) are applied to the gate or control electrodes 11 and 12 of the controlled rectifiers 5 and 6 in FIGURE 1.

Figure 5A:
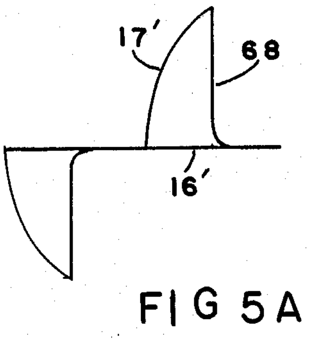
Figure 6A:
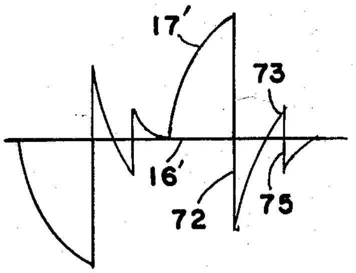
Figure 5B:
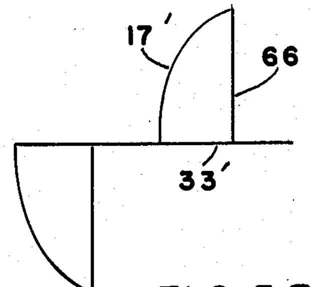
Figure 6B:
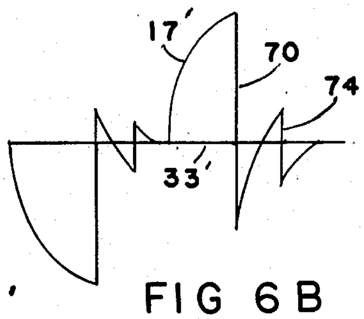
Figure 5C:
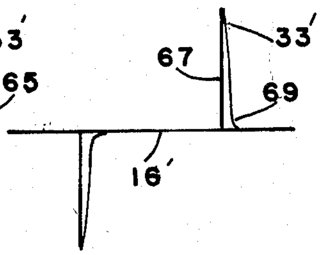

FIGURES 5(A), 5(B) and 5(C) show the same voltages as appear in FIGURES 4(A), 4(B) and 4(C), except that the transformer primary 36 has lower impedance so that it applies a heavier loading to the output 16—17 of the phase-shifting network 13. I have found that under suitable loading conditions, after the toroidal inductor 30 has saturated, at 66 in FIGURE 5(B), so as to achieve a conducting condition, the current taken by the transformer primary is so high that shortly after the transformer pulse has risen as shown at 67 in FIGURE 5(C), the output voltage 16'—17' of the phase-shifting network 13 is effectively shortcircuited and collapses to zero, as shown at 68 in FIGURE 5(A). Accordingly, said output voltage is no longer available for application to transformer primary 36 so that its voltage also collapses as at 69 in FIGURE 5(C) and the pulse of voltage 16'—33' is a single spike shaped pulse of short duration. This is very desirable for the firing of silicon controlled rectifiers, for instance of the General Electric type C–35, in which a peak gate power of 5 watts is permissible, but the average gate power must be limited to 0.5 watts. Furthermore, this condition of impedance matching has the advantage that much of the energy which has been stored in the phase shifting network is released as a single spike shaped pulse having a high peak power in relationship to the average power output of the phase shifting network. This permits the use of relatively small and inexpensive components in the phase shifting network which in turn can be controlled by a relatively small control signal; for instance, I have found it possible to produce a single spike shaped pulse having a peak power of more than 500 milliwatts, and to shift its phase angle over 180 degrees by application of a direct current control signal of less than 4 milliwatts to terminals 18 and 19 in FIGURE 1.

However, there are certain conditions under which the short single spike pulse of gate voltage will not fire the controlled rectifier, and where a sustained pulse would be more desirable if it did not overload the rectifier gate, as will be explained later.

In order to meet this requirement, I have found it possible to produce a plurality of short pulses, by reducing the impedance of transformer primary 36 still further, so as to apply a still heavier load to the output 16—17 of the phase-shifting network 13 of FIGURE 1. In this way, I have been successful in producing the waveforms shown in FIGURES 6(A), 6(B) and 6(C). In this arrangement, the toroidal inductor 30 saturates at 70 in FIGURE 6(B) and permits the transformer primary 36 to take such a heavy current at 71 in FIGURE 6(C) that it reduces the output voltage 16'—17' of the phase-shifting network to less than zero, as shown at 72 in FIGURE 6(A); this probably occurs due to the phenomenon of "ringing," or the setting up of a damped oscillation in the resonant circuit comprising inductive elements 25 and capacitor 26 of FIGURE 1. After the phase shifter output voltage has swung negative, at 72 in FIGURE 6(A), it again swings positive as at 73 in FIGURE 6(A) and again saturates the toroidal inductor 30 as at 74 in FIGURE 6(B), thus permitting a further pulse of heavy current 76 to flow through the transformer primary 36 and again sharply reducing the output 16'—17' of the phase-shifting network 13 to a negtive value as shown at 75 in FIGURE 6(A). This repetition of saturation of the toroidal inductor 30 may occur once, twice, or even more often in each half cycle. Each time it occurs, a steeply rising short pulse is developed across the transformer primary 36 and is passed on to its secondary windings 37, 38, as shown at 71 and 76 in FIGURE 6(C).

I have determined the approximate impedance matching requirements experimentally, by connecting a resistor in place of the transformer primary 36 in FIGURE 1, and observing the waveform of the voltage across said resistor with an oscilloscope. For these tests I used a capacitor 26 of 0.27 microfarad, together with a saturable reactor 28 having inductive windings 25 which resonated with said capacitor upon application of an appropriate direct current signal to the control terminals 18 and 19, and I obtained the following results:

With a resistor of 30,000 ohms I obtained waveforms similar to FIGURE 4,

With a resistor of 3,000 ohms I obtained waveforms similar to FIGURE 5,

With a resistor of 500 ohms I obtained waveforms similar to FIGURE 6.

In order to limit the variations in load matching due to changes in the internal gate-to-cathode resistance of the controlled rectifiers 5 and 6, I have connected a loading resistor of the order of 50 ohms from gate 11 to cathode 7, and a similar resistor from gate 12 to cathode 10.

Figure 6C:
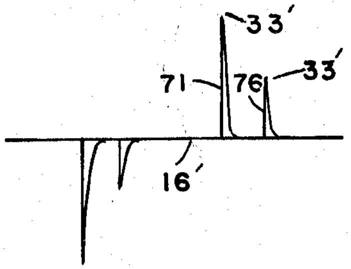
Figures 7, 8, 9:
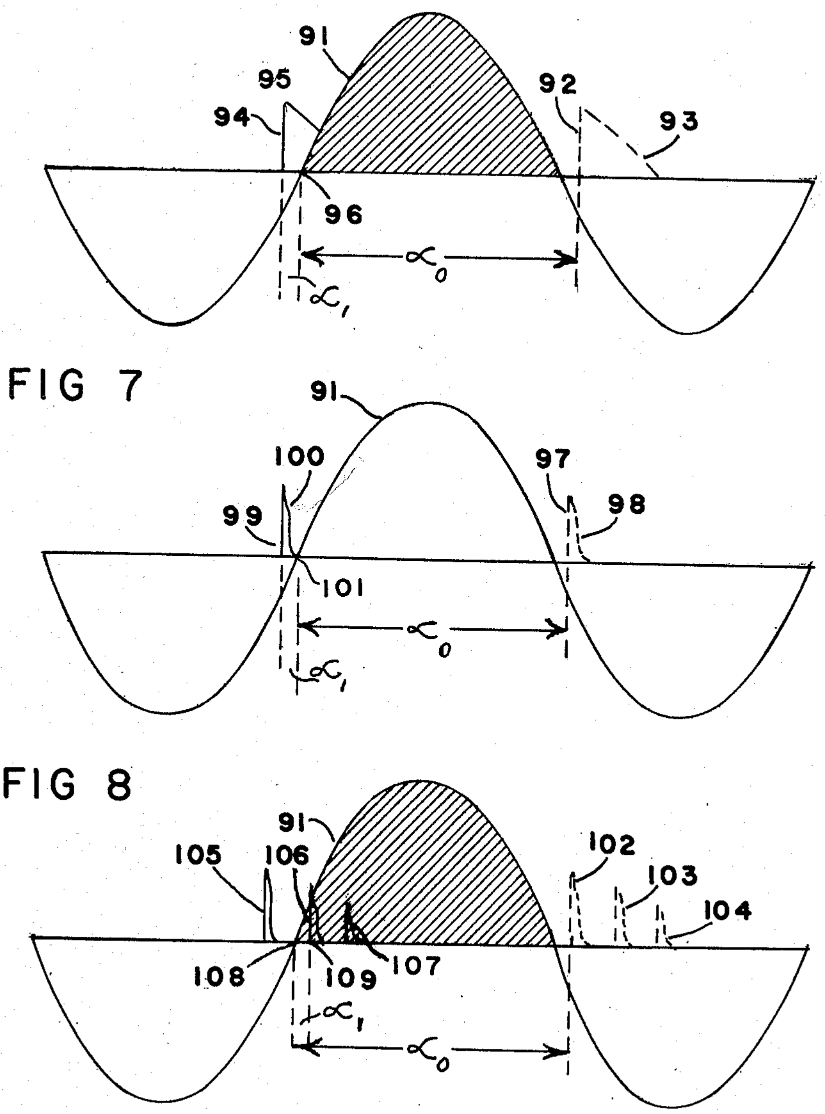
FIGURE 7 shows the waveform of the firing pulses under one set of impedance-matching conditions.
FIGURE 8 shows the waveform of the firing pulses under another set of impedance-matching conditions.
FIGURE 9 shows the waveform of the firing pulses under a further set of impedance-matching conditions.

The relative advantages of the alternative firing pulse waveforms of FIGURES 4(C), 5(C) and 6(C) will now be explained and illustrated by FIGURES 7, 8 and 9 respectively. In FIGURE 7, the sine wave 91 represents the alternating voltage applied to the anode of a silicon controlled rectifier. The dotted curve 92, 93 shows the pulse of voltage applied to the gate in its fully retarded condition, starting at an angle $\alpha_0$ which is more than 180 degrees after the start of positive anode voltage at 96; this pulse starts at 92 after the anode voltage has ceased to be positive, and accordingly the anode does not fire and the current is zero. The solid curve 94, 95 shows the gate pulse in a fully advanced condition, starting at an angle $\alpha_1$ which is slightly before the start of positive anode voltage at 96; since the pulse is sustained over the portion 95, it is still positive at the point 96 at which the anode becomes positive and the anode will therefore fire at point 96 or shortly thereafter and the controlled rectifier will pass anode current for the complete half cycle as shown by the shaded area. The gate pulse is produced as described with reference to FIGURE 4(C).

FIGURE 8 shows the same conditions as FIGURE 7, except that the gate voltage is a single spike shaped pulse of short duration as shown in FIGURE 5(C). In its fully retarded position, at 97, 98, the pulse occurs too late to fire the anode. In its fully advanced position 99, 100, the pulse has started and finished before the anode becomes positive at 101, and accordingly the anode will not fire, and no anode current will be passed. In the intermediate positions of the pulse as the angle $\alpha$ is reduced from 180 degrees lagging to 0 degrees lagging, the anode will fire progressively earlier as shown in FIGURES 3(A), 3(B) and 3(C), and the anode current will progressively increase until angle $\alpha$ is reduced to zero and becomes slightly leading, at which point the anode will stop firing and the anode current will drop abruptly from maximum to zero. For some applications, this discontinuity of anode current may be a disadvantage which may be overcome by using a gate pulse waveform as shown in FIGURE 7; however the wide pulse 94, 95 of FIGURE 7 may result in a higher ratio of average to maximum gate power than may be safely applied to the gate; furthermore, in order to obtain a sufficiently high peak power to fire the gate, it is necessary to supply considerably more average output power from the phase-shifting network to produce the wide pulse 94, 95 of FIGURE 7, in contrast with the average output power to produce the spike shaped pulse 99, 100 of FIGURE 8.

I have found it an advantage in some cases for the above reasons to apply a plurality of short spike shaped pulses to the gate of a silicon controlled rectifier, as shown in FIGURE 9. In FIGURE 9, a succession of three short pulses 102, 103 and 104 are shown in their fully retarded position in which the ignition angle $\alpha_0$ to the start of pulse 102 is more than 180 degrees and the anode does not fire. These three pulses are shown in their fully advanced position at 105, 106 and 107; the first pulse 105 is completed before the anode becomes positive at 108 and accordingly this pulse does not fire the anode; however, the second pulse 106 starts at a small angle $\alpha_1$, very shortly after he anode has become positive at 108, and it accordingly fires the anode at point 109 and causes current to flow during the entire shaded area in FIGURE 9 which is only slightly less than the total shaded area of FIGURE 7. Furthermore, a given peak power can be produced in each of the three pulses 105, 106, and 107, or at least in the first two pulses 105, 106, with a considerably lower average power than is required in the arrangement of FIGURE 7, thus reducing the possibility of damaging the rectifier gate and also making possible the use of a lower output from the phase-shifting network. The multiple gate pulses of FIGURE 9 are produced by the method described with reference to FIGURE 6(C).

Figure 10:
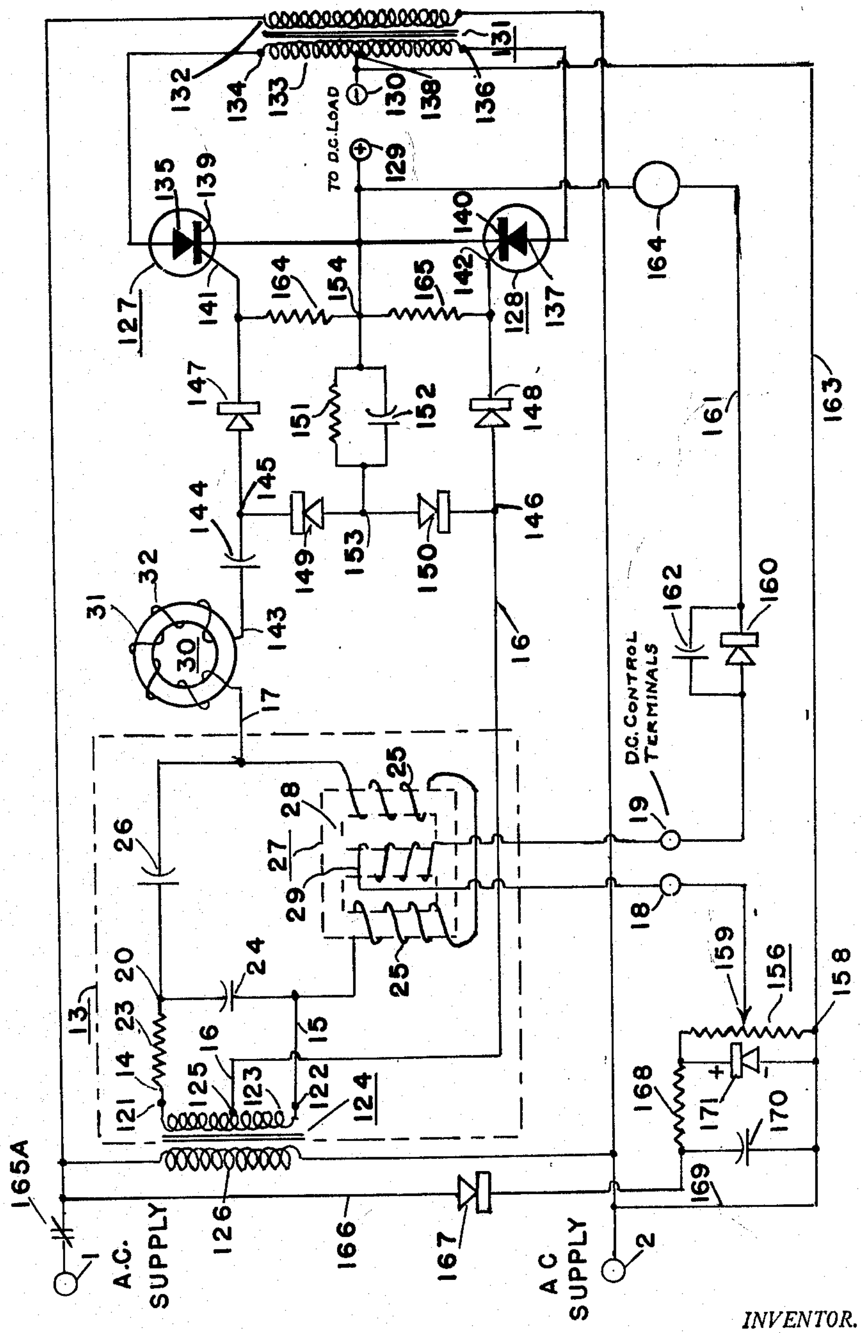
FIGURE 10 shows a circuit diagram of an alternative form of my invention.

FIGURE 10 shows an alternative circuit arrangement, in which several of the components are similar in function to those of FIGURE 1 and which are similarly numbered and their description will not be repeated. In FIGURE 10, however, the input conductors 14 and 15 of the phase-shifting network 13 are connected to the opposite ends 121, 122 of the secondary winding 123 of a transformer 124; the output conductor 16 is connected to an intermediate point 125 on the secondary 123. The primary 126 of transformer 124 is connected across the alternating current supply terminals 1 and 2, through the normally closed relay contact 165A.

The controlled rectifiers 127, 128 of FIGURE 10 are connected in a full wave rectifying circuit for supplying a direct current load connected to terminals 129 and 130. An anode transformer 131 has its primary 132 connected across the alternating current supply terminals 1 and 2. Its secondary winding 133 has one end 134 connected to the anode 135 of rectifier 127; the other end 136 is connected to the anode 137 of rectifier 128; the center tap 138 of secondary 133 is connected to the negative load terminal 130. The cathode 139 of rectifier 127 and the cathode 140 of rectifier 128 are both connected to the positive load terminal 129.

The controlled rectifier 127 has a control electrode or gate 141, and the controlled rectifier 128 has a control electrode or gate 142, and the following circuit is provided for delivering positive pulses alternately to each of said gates, so as to fire the rectifiers at times which are determined by the phase-shifting network 13. The output conductor 17 of the phase-shifting network 13 is connected through the toroidal winding 32 of inductor 30 to a point 143, and thence through a capacitor 144 to a point 145, and thence through a diode 147 to the gate 141 of controlled rectifier 127; the cathode of diode 147 is connected to gate 141. The output conductor 16 of the phase-shifting network 13 is connected to point 146 and thence through a diode 148 to the gate 142 of controlled rectifier 128; the cathode of diode 148 is connected to gate 142. Diode 149 has its cathode connected to point 145 and its anode to point 153; diode 150 has its cathode connected to point 146 and its anode to point 153. Point 153 is connected through resistor 151 to point 154 which is connected to rectifier cathodes 139 and 140; a capacitor 152 is shunted across resistor 151. Loading resistors 164 and 165 are connected from the rectifier gates 141, 142 respectively, to the point 154, for the purpose of reducing the variation in loading of the phase shifting network due to variations in the internal gate-to-cathode resistance of the controlled rectifiers 127, 128.

The circuit of FIGURE 10 is arranged for automatic or self-regulation of the voltage across its direct current load terminals 129 and 130 as follows: A source of direct current reference voltage is obtained from the alternating current supply, from terminal 1, through relay contact 165A, conductor 166, rectifier 167, resistor 168, potentiometer 156 and conductor 169 to terminal 2. The reference voltage source is filtered by means of capacitor 170, and its voltage is regulated by means of the Zener diode 171 which maintains a substantially constant direct current voltage across its terminals, regardless of the current through it. The slider 159 of potentiometer 156 is connected through direct current control terminal 18, control winding 29, control terminal 19, diode 160, conductor 161 and relay coil 164 to the positive direct current load terminal 129; the anode of diode 160 is connected to the control terminal 19, and a capacitor 162 is connected across the diode 160. The lower or negative end 158 of potentiometer 156 is connected through conductor 163 to the negative direct current terminal 130. The relay coil 164 is associated with the latching type contact 165A which is normally closed and which only opens when a predetermined current flows through coil 164 and then remains open until it is manually reset.

The operation of the circuit of FIGURE 10 will now be explained with reference to FIGURES 2, 3, 4, 5, 6, 7, 8 and 9. When no signal is applied to the direct current control terminals 18, 19 of phase-shifting network 13, the output voltage between terminals 16′ and 17′ lags the input voltage 16′—14′ by an angle $\phi_A$ which is almost 90 degrees, as shown in FIGURES 2(A) and 3(A). When the output voltage 16′—17′ has been positive for a sufficient length of time, the toroidal inductor 30 suddenly saturates and allows a positive pulse of current to flow from output conductor 17, through coil 32, point 143, capacitor 144, point 145, diode 147, rectifier gate 141, rectifier cathode 139, point 154, capacitor 152, point 153, diode 150 and point 146, to output conductor 16, and this pulse occurs at a time shown by angle $\alpha_A$, after the anode voltage of the controlled rectifier, which is in phase with 16'—14', has become negative, as shown at 39' in FIGURE 3(A) and accordingly the controlled rectifier is not fired and delivers no anode current.

When a moderate direct current signal is applied between terminals 18 and 19, the output voltage 16'—17'' of the phase-shifting network 13 is advanced in phase angle so that it leads the input voltage 16'—14' by a small angle $\phi_B$; the positive pulse of current is therefore applied to the gate 141 at an angle $\alpha_B$ which is approximately 90 degrees after the anode voltage, which is in phase with the input voltage 16'—14', has become positive as shown at 39'' in FIGURE 3(B); accordingly the anode 135 of the controlled rectifier 127 fires at this point and anode current flows during the period of the shaded area in FIGURE 3(B). When the direct current control signal is increased, the phase angle of the voltage 16'—17''' is further advanced so as to lead the anode voltage by the angle $\phi_C$ in FIGURES 2(C) and 3(C); the positive pulse of current 39''' is then applied to the gate 141 of rectifier 127 just after the anode 135 has attained a positive voltage, as shown in FIGURE 3(C); anode current then flows during the whole shaded area of FIGURE 3(C). In this way, the anode current is gradually increased from zero to maximum as the direct current control signal applied to terminals 18 and 19 of FIGURE 10 is increased from zero to a predetermined value.

If the direct current control signal is further increased, it may be arranged to have any one of the alternative results shown in FIGURES 7, 8 or 9, depending upon the degree of loading of the phase-shifting network 13 by the rectifier gate circuits including the rectifier gates 141, 142 and their loading resistors 164, 165.

When the effective gate-to-cathode resistance is high in relation to the output impedance between conductors 16 and 17 of the phase-shifting network 13, the pulse 94 applied to the gate 141 is of long duration as shown in FIGURE 7 and the anode 135 of controlled rectifier 127 continues to be fired at point 96; the reason for the long duration of the pulse 94–95 is explained with reference to FIGURE 4.

When the output impedance of the phase-shifting network 13 is increased, by the use of a smaller capacitor 26 and larger inductance 25, this has the effect of reducing the ratio of the effective gate-to-cathode resistance in relation to the phase shifter output impedance, and this results in a single spike shaped pulse, such as the pulse 99—100 in FIGURE 8; the reason for this pulse being of short duration is explained with reference to FIGURE 5. It will be seen that the spike shaped pulse 99—100 in FIGURE 8 has terminated before the anode voltage, which is in phase with 91, has become positive, and accordingly the rectifier anode does not fire. I have used this phenomenon to protect the controlled rectifier against excessive overload, as will be later explained.

When the output impedance of the phase-shifting network is made still higher, by the use of still smaller capacitance 26 and larger inductance 25, the ratio of effective gate-to-cathode resistance to phase shifter output impedance is still further reduced and I can obtain a plurality of spike shaped pulses such as 105, 106 and 107 in FIGURE 9, for the reasons explained with reference to FIGURE 6. Under these conditions, the second pulse 106 will cause the rectifier anode to fire at the point 109 in FIGURE 9 and it will continue to fire throughout the shaded area.

The above description relates to the application of positive pulses to the gate 141 of rectifier 127, once in every cycle of the alternating current supply. During the alternate half cycles, similar positive pulses are applied to the gate 142 of rectifier 128. Starting with a positive output voltage at conductor 16 of the phase-shifting network 13, current flows through point 146, diode 148, gate 142, cathode 140, point 154, capacitor 152, point 153, diode 149, point 145, capacitor 144, point 143 and saturable inductor winding 32 to output conductor 17.

When using silicon controlled rectifiers at 127, 128, I have found it important to include the capacitor 144 in order to block the flow of direct current from the saturable reactor windings 25 and the saturable inductor winding 32 into the rectifier gates 141 and 142, since the currents to the two gates frequently differ considerably and thus produce differing degrees of saturation in the magnetic cores 28 and 31; I have found that this may cause the positive pulses which are applied alternately to gates 141 and 142 to be irregularly spaced, whereas if the blocking capacitor 144 is used the said pulses are spaced 180 degrees apart as desired.

I have also found it desirable to use the resistor 151, shunted by capacitor 152 as a means of developing and storing a negative bias which shortens the pulses applied to the gates.

Referring again to FIGURE 10, the direct current voltage across the load terminals 129, 130, is automatically regulated by balancing this voltage against a reference voltage obtained from the potentiometer 156, through the potentiometer slider 159, control terminal 18, control winding 29, control terminal 19, diode 160, conductor 161, relay coil 164, load terminal 129, load terminal 130, conductor 163 and potentiometer lower end 158.

As well known to those skilled in the art, this arrangement automatically regulates the direct current voltage across terminals 129, 130 so that it is always slightly less than the reference voltage between potentiometer tap 159 and point 158, by an amount equal to an error signal appearing across the direct current control terminals 18 and 19, diode 160 and relay coil 164 in series; the diode 160 prevents accidental reversal of the error signal, and the capacitor 162 inhibits the formation of a spurious error signal due to the rectification of ripple by diode 160.

I will now explain an important feature of my invention which provides protection against excessive current through the controlled rectifiers 127 and 128. Under normal conditions of operation, the error signal across control terminals 18 and 19 is small compared with the reference voltage; for instance, the reference voltage might be 100 volts, the error signal 1 volt and the direct current load voltage 99 volts; the angle of ignition $\alpha$ in FIGURE 3 is somewhere between 0 degrees and 180 degrees lagging the start of positive anode voltage; however, if an excessive current is drawn from the load terminals 129, 130, for instance by a short-circuit, the direct current voltage across said terminals will decrease and the error signal across the control terminals 18, 19 is accordingly increased.

When the load voltage has decreased by a predetermined amount, due to excessive load current, the error signal will be increased until the angle of ignition $\alpha$ leads the start of positive anode voltage, as at $\alpha_1$ in FIGURES 7, 8 and 9. An important part of my invention consists in providing a spike shaped pulse such as that shown at 99, 100 in FIGURE 8, in combination with means for varying its phase angle by more than 180 degrees, so that under these conditions of excessive load current and larger-than-normal error signal the anode ceases to fire and the rectifier current is turned off. Furthermore, after the rectifiers 127 and 128 have been turned off in this way, the full reference voltage between the potentiometer slider 159 and its lower end 158 is applied to the control winding 29 in series with the diode 160 and the relay coil 164 and this ensures that the angle of ignition $\alpha$ continues to lead the start of positive anode voltage so that the rectifier anodes remain in a non-firing condition. The load current can then only be restored by turning down the potentiometer slider 159 so as to reduce the reference voltage to a very small value corresponding to the normal error signal.

To ensure even more complete protection, I may also provide a latching relay having its coil 164 in series with the control signal circuit and having a normally closed contact 165A in series with the alternating current supply circuit, so that it is necessary also to reset this relay before load current can be re-established. This latching relay can be relatively insensitive and non-critical, since upon the occurrence of an overload which is sufficient to advance the firing angle $\alpha$ far enough to turn off the rectifiers 127 and 128, the voltage across the relay coil 164 in series with the control winding 29 suddenly increases from a value corresponding to the error signal, for instance of the order of 1 volt, to the full amount of the reference voltage, for instance of the order of 100 volts.

Although this invention has been described with particular reference to the control of solid state rectifiers, it will be appreciated that the techniques described may be used for other purposes wherein accurately spaced and phase shiftable spike shaped pulse signals are required, such as the control of thyratrons or mercurey pool rectifiers, or for pulse time or pulse position modulation, or other timing or triggering systems. When used for controlling thyratrons or mercury pool rectifiers it is desirable to provide additional biasing means whereby the positive spike shaped pulses are superimposed upon a negative bias.

Furthermore, in the particular forms of the invention which have been described, the phase shift in the output has been produced by varying the inductance of the windings 25. However, the phase shift may be produced in any manner which varies the relative impedance of an inductive element such as the windings 25 and of a capacitive element such as the capacitor 26; this may be accomplished for instance by varying the capacitance of the capacitive element 26, for example by providing said element with a temperature-sensitive dielectric as described in U.S. Patent 2,842,345. Alternatively the relative impedance may be varied by varying the frequency, while the capacitance and inductance remain constant.

Although the invention has been described in its preferred form with a certain degree of particularity, it is understood that the present disclosure of the preferred form has been made only by way of example and that numerous changes in the details of circuit construction and the combination and arrangement of circuit elements may be resorted to without departing from the spirit and the scope of the invention as hereinafter claimed.

What is claimed is:

1. In a control circuit of the type described, a phase shifting network comprising: a capacitive voltage dividing means including at least a first and a second capacitive element serially connected to one another with a center tap therebetween; said dividing means adapted to be connected across an alternating current supply for receiving therefrom an input signal; the series combination of a resistive element and a third capacitive element connected across said voltage dividing means; the series combination of a fourth capacitive element and an inductive element connected across said third capacitive element; means varying the relative impedance of said inductive and fourth capacitive elements whereby said network is adapted to produce an output signal between said tap and the junction between said fourth capacitive element and said inductive element, which output signal is phase shifted relative to the input signal in response to the value of the impedance of said inductive element with respect to said fourth capacitive element; further phase retarding and signal peaking means which include another inductive element; and a transformer connected to receive said output signal; said transformer being possessed of an impedance which presents a substantial load to the phase shifting network to cause the output signal after being modified by said retarding and peaking means to be at least one spike shaped pulse for each half cycle of said alternating current input signal, and said first, third and fourth capactive elements forming a low impedance return path for said pulse signal.

2. In a control circuit as set forth in claim 1 wherein said another inductive element comprises an inductance having a magnetic core made from magnetizable material which exhibits a substantially rectangular hysteresis curve.

3. In a control circuit as set forth in claim 1 wherein said another inductive element and said transformer are serially connected.

4. In a control circuit as set forth in claim 1 wherein said transformer has a primary winding and two secondary windings.

5. In a control circuit as set forth in claim 1 wherein the impedance of said transformer is such that the output signal comprises a plurality of spike shaped pulses for each half cycle of said alternating current input signal.

6. In a control circuit for unidirectional current conducting devices, a phase shifting network comprising: a capacitive voltage dividing means including at least a first and a second capacitive element serially connected to one another with a center tap therebetween; said dividing means adapted to be connected across an alternating current supply for receiving therefrom an input signal; the series combination of a resistive element and a third capacitive element connected across said voltage dividing means; the series combination of a fourth capacitive element and an inductive element connected across said third capacitive element; means varying the relative impedance of said inductive and fourth capactive elements whereby said network is adapted to produce an output signal between said tap and the junction between said fourth capacitive element and said inductive element, which output signal is phase shifted relative to the input signal in response to the value of the impedance of said inductive element with respect to said fourth capacitive element; further phase retarding and signal peaking means which include another inductive element; a transformer having a primary and a secondary winding connected to receive said output signal whereby said output signal flows serially through said another inductive element and primary transformer winding; said primary transformer winding being possessed of an impedance which presents a substantial load to the phase shifting network to cause the output signal after being modified by said retarding and peaking means to be at least one spike shaped pulse for each half cycle of said alternating current input signal; a set of unidirectional current conducting devices connected to said secondary winding for receiving said spike shaped pulse to cause said devices to pass cyclically from their non-conductive state to their conductive state, and said first, third and fourth capacitive elements being in series with said another inductive element and primary transformer winding forming a low impedance return path for said pulse signal.

7. In a control circuit as set forth in claim 6 wherein said secondary transformer winding is center tapped and one unidirectional conducting device is connected across each end of said secondary winding and the center tap.

8. In a control circuit as set forth in claim 6 wherein said secondary winding is connected to said set of unidirectional conducting devices in series with protective unidirectional current conducting means.

9. In a control circuit the combination of: a phase shifting network adapted to be coupled to an alternating current supply for receiving therefrom an input signal and for providing a resultant phase shifted output signal; said phase shifting network including variable inductance means to cause said output signal to be phase shiftable relative to the input signal in excess of 180 degrees in response to the impedance of said inductance; peaking means connected to receive said output signal and to produce therefrom a pulse signal which is adapted to initiate conduction in unidirectional current conducting devices which supply energy to an electrical load; means for receiving a reference signal and a signal from said load, the difference signal thereof being applied as a control signal to said variable inductance means to vary the impedance thereof and hence the phase angle of the output signal, and said difference signal being applied to said inductance means in such a manner that when the voltage across said load is decreasing as caused by increasing current, the control signal changes the impedance of the inductance means until the pulse signal is phase shifted in a direction and to such an extent as to fail to initiate current conduction in said devices.

10. In a control circuit the combination of: a phase shifting network adapted to be coupled to an alternating current supply for receiving therefrom an input signal and for providing a resultant phase shifted output signal; said phase shifting network including an electromagnetic control winding for varying the impedance of said network thereby causing said output signal to be phase shiftable relative to the input signal in excess of 180 degrees in response to the impedance of said inductance; peaking means connected to receive said output signal and to produce therefrom a pulse signal which is adapted to initiate conduction in at least one unidirectional current conducting device which supplies energy to an electrical load; means for receiving a reference signal and a signal responsive to the magnitude of said load, the difference signal thereof being applied as a control signal to said control winding to vary the impedance of said network and hence the phase angle of the output signal, and said difference signal being applied to said control winding in such a manner that when the voltage across said load is decreasing as caused by increasing current, the control signal changes the impedance of the inductance means until the pulse signal is phase shifted in a direction and to such an extent as to fail to initiate current conduction in said at least one device.

11. In a control circuit as set forth in claim 10 wherein said difference signal upon increasing in magnitude due to a decrease of the signal from said load as caused by increasing current therethrough, causes the output signal from said phase shifting network to advance in phase angle and such advance adapted to be in excess of 180 degrees at a predetermined value of said difference signal.

12. In a control circuit the combination of: a phase shifting network adapted to be coupled to an alternating current supply for receiving therefrom an input signal and for providing a resultant phase shifted output signal; said phase shifting network including variable inductance means to cause said output signal to be phase shiftable relative to the input signal in excess of 180 degrees in response to the impedance of said inductance; peaking means and a serially connected direct current blocking capacitor connected to said output signal, said series connection changing said output signal to a substantially short pulse signal which is adapted to initiate conduction in unidirectional current conducting devices supplying energy to an electrical load; means for receiving a reference signal and a signal from said load, the difference signal thereof being applied as a control signal to said variable inductance means to vary the impedance thereof and hence the phase angle of the output signal, and said difference signal being applied to said inductance means in such a manner that when the voltage across said load is decreasing as caused by increasing current, the control signal changes the impedance of the inductance means until the pulse signal is phase shifted in a direction and to such an extent as to fail to initiate current conduction in said devices.

13. In a control circuit as set forth in claim 10 wherein said reference signal is derived from the same source as the input signal to said network.

14. In a control circuit the combination of: a phase shifting network adapted to be coupled to an alternating current supply for receiving therefrom an input signal and for providing a resultant phase shifted output signal; said phase shifting network including an electromagnetic control winding for varying an impedance in said network thereby causing said output signal to be phase shiftable in excess of 180 degrees relative to the input signal in response to the variation of said impedance; peaking means connected to receive said output signal and to produce therefrom a pulse signal which is adapted to initiate conduction in unidirectional current conducting devices which supply energy to an electrical load; means for receiving a reference signal and a signal proportional to the magnitude of said load, the difference signal therebetween being applied as a control signal to said control winding to vary said impedance and hence the phase angle of the output signal; said difference signal being applied to said control winding in such a manner that when the voltage across said load is decreasing as caused by increasing current, the control signal changes the impedance in said network until at a predetermined value of said difference signal the pulse signal is advanced by more than 180 degrees thereby failing to initiate current conduction in said devices; means connected for sensing said difference signal and causing said network to become disconnected from said alternating current supply when said difference signal exceeds a certain value.

15. A control circuit as set forth in claim 14 wherein said sensing means is a latching relay.

16. A control circuit as set forth in claim 14 wherein said network becomes disconnected from said alternating current supply by means of a relay contact associated with the means sensing said difference signal.

17. In a control circuit the combination of: a phase shifting network adapted to be coupled to an alternating current supply for receiving therefrom an input signal and for providing a resultant phase shifted output signal; said phase shifting network including variable impedance means to cause said output signal to be phase shiftable relative to the input signal in response to the value of said impedance; peaking means and a serially connected direct current blocking capacitor connected to said output signal whereby said series connection modifies said output signal to cause a substantially short, pulse signal.

References Cited in the file of this patent

UNITED STATES PATENTS

| | | |
|---|---|---|
| 2,229,450 | Garman | Jan. 21, 1941 |
| 2,362,294 | Mittag | Nov. 7, 1944 |
| 2,524,759 | Brown | Oct. 10, 1950 |
| 2,524,760 | Brown | Oct. 10, 1950 |
| 2,524,761 | Brown | Oct. 10, 1950 |
| 2,524,762 | Brown | Oct. 10, 1950 |
| 2,600,315 | Mittag et al. | June 10, 1952 |
| 2,606,966 | Pawley | Aug. 12, 1952 |
| 2,805,386 | Pfaff | Sept. 3, 1957 |
| 2,809,342 | Shrider et al. | Oct. 8, 1957 |
| 2,887,648 | Kubler | May 19, 1959 |

UNITED STATES PATENT OFFICE
CERTIFICATE OF CORRECTION

Patent No. 3,128,422

April 7, 1964

Walter J. Brown

It is hereby certified that error appears in the above numbered patent requiring correction and that the said Letters Patent should read as corrected below.

Column 8, line 43, for "0.27" read -- .027 --.

Signed and sealed this 27th day of October 1964.

(SEAL)
Attest:

ERNEST W. SWIDER
Attesting Officer

EDWARD J. BRENNER
Commissioner of Patents